(12) United States Patent
Mann et al.

(10) Patent No.: US 9,350,678 B2
(45) Date of Patent: May 24, 2016

(54) CONTROLLER BASED NETWORK RESOURCE MANAGEMENT

(71) Applicant: International Business Machines Corporation, Armonk, NY (US)

(72) Inventors: Vijay Mann, Gurgaon (IN); Naga R. Samineni, Dublin (IE); Anil K. Vishnoi, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 14/306,375

(22) Filed: Jun. 17, 2014

(65) Prior Publication Data
US 2015/0200864 A1    Jul. 16, 2015

Related U.S. Application Data

(63) Continuation of application No. 14/156,527, filed on Jan. 16, 2014.

(51) Int. Cl.
| | | |
|---|---|---|
| *H04L 12/841* | (2013.01) | |
| *H04L 12/851* | (2013.01) | |
| *H04L 12/801* | (2013.01) | |
| *H04L 12/743* | (2013.01) | |

(52) U.S. Cl.
CPC ............ *H04L 47/28* (2013.01); *H04L 47/2441* (2013.01); *H04L 47/29* (2013.01); *H04L 45/7457* (2013.01)

(58) Field of Classification Search
None
See application file for complete search history.

(56) References Cited

U.S. PATENT DOCUMENTS

| | | | |
|---|---|---|---|
| 7,460,534 B1 * | 12/2008 | Bellenger | H04L 45/745 370/392 |
| 7,774,538 B2 | 8/2010 | Hong et al. | |
| 7,936,764 B1 | 5/2011 | Krishnan | |
| 8,054,744 B1 | 11/2011 | Bishara et al. | |
| 2004/0083299 A1 * | 4/2004 | Dietz | G06F 17/30985 709/230 |
| 2008/0225874 A1 | 9/2008 | Lee | |

(Continued)

FOREIGN PATENT DOCUMENTS

WO     2012126488 A1    9/2012

OTHER PUBLICATIONS

Benson et al., "Network Traffic Characteristics of Data Center in the Wild", IMC '10: Proceedings of the 10th ACM SIGCOMM Conference on Internet Measurement, Nov. 2010, pp. 267-280, ACM, New York, NY, USA, © 2010. DOI: 10.1145/1879141.1879175.

(Continued)

*Primary Examiner* — Hoon J Chung
(74) *Attorney, Agent, or Firm* — Scott A. Berger

(57) ABSTRACT

According to embodiments of the disclosure, methods, apparatuses, and computer products for controller based network resource management are disclosed. The method may include receiving a flow at a network controller, determining a flow parameter for the flow, and determining, via the network controller, an idle timeout for a flow rule, corresponding to the flow based on the flow parameter. Determining a previous idle timeout for the flow in response to determining that the flow has been received before, and determining an activity factor for the flow rule in response to the previous idle timeout being greater than or equal to the second value. The apparatus may be a network controller including a processor, and a memory configured to receive a flow, determine a flow parameter for the flow, and determine an idle timeout for the flow rule based on the flow parameter.

1 Claim, 4 Drawing Sheets

(56) References Cited

U.S. PATENT DOCUMENTS

| | | | |
|---|---|---|---|
| 2010/0188976 A1* | 7/2010 | Rahman | H04L 47/10 370/235 |
| 2010/0257263 A1 | 10/2010 | Casado et al. | |
| 2011/0038375 A1 | 2/2011 | Liu et al. | |
| 2012/0099591 A1 | 4/2012 | Kotha et al. | |
| 2012/0246400 A1 | 9/2012 | Bhadra et al. | |
| 2013/0060940 A1 | 3/2013 | Koponen et al. | |
| 2013/0208621 A1 | 8/2013 | Manghirmalani et al. | |
| 2013/0230047 A1 | 9/2013 | Subrahmaniam et al. | |

OTHER PUBLICATIONS

Kandula et al., "The Nature of Datacenter Traffic: Measurements & Analysis", IMC '09: Proceedings of the 9th ACM SIGCOMM Conference on Internet Measurement and Conference, Nov. 2009, pp. 202-208, ACM, New York, NY, USA, © 2009. DOI: 10.1145/1644893.1644918.

Ma et al., "Leveraging Parallelism for Multi-dimensional Packet Classification on Software Routers", SIGMETRICS '10: Proceedings of the ACM SIGMETRICS international conference on Measurement and modeling of computer systems, Jun. 2010, pp. 227-238, Copyright 2010 ACM, New York, NY. DOI: 10.1145/1811039.1811065.

McGeer et al., "Minimizing Rulesets for TCAM Implementation", INFOCOM 2009, IEEE, 2009, pp. 1314-1322, © IEEE. DOI: 10.1109/INFOCOM.2009.5062046.

Meiners et al., "TCAM Razor: A Systematic Approach Towards Minimizing Packet Classifiers in TCAMs", Proceedings of the 15th IEEE International Conference on Network Protocols (ICNP), Oct. 2007, pp. 226-275. http://www.cse.msu.edu/~alexliu/publications/TcamRazor/TcamRazor.pdf.

Meiners et al., "Topological Transformation Approaches to Optimizing TCAM-Based Packet Classification Systems", SIGMETRICS '09: Proceedings of the eleventh international joint conference on Measurement and modeling of computer systems, SIGMETRICS/Performance '09, Jun. 2009, vol. 37, Issue 1, pp. 73-84, Copyright 2009 ACM, New York, NY. DOI: 10.1145/1555349.1555359.

Wei et al., "Block Permutations in Boolean Space to Minimize TCAM for Packet Classification", INFOCOM, 2012 Proceedings, The 31st Annual IEEE International Conference on Computer Communications: Mini Conference, IEEE, 2012, pp. 2561-2565, © 2012 IEEE. DOI: 10.1109/INFCOM.2012.6195653.

Yu, M., "Scalable Management of Enterprise and Data-Center Networks", Dissertation, Presented to Faculty of Princeton University in Candidacy for Degree of Doctor of Philosophy, Sep. 2011, pp. 1-33, © Copyright by Minlan Yu, 2011. http://www.dtic.mil/dtic/tr/fulltext/u2/a571020.pdf.

Zareck, A., "OpenFlow Timeouts Demystified", Department of Computer Science, University of Toronto, © Adam Zarek, 2012. http://www.eecg.toronto.edu/~lie/papers/zarek_mscthesis.pdf.

Mann et al., "Controller Based Network Resource Management", U.S. Appl. No. 14/156,527, filed Jan. 16, 2014.

\* cited by examiner

CONTROLLER BASED NETWORK RESOURCE MANAGEMENT

BACKGROUND

The present disclosure relates to the field of software defined network memory management. As society has become more mobile and reliant upon technology, computer networks are increasingly utilized and relied upon to transfer information between two or more places. One aspect of networking systems, such as in software defined networks, is controller based network resource management. As technology improves the need for improved networking systems may increase.

SUMMARY

A method of network controller based network resource management may include receiving a flow at a network controller, determining a flow parameter for the flow, and determining, via the network controller, an idle timeout for a flow rule, corresponding to the flow, based on the flow parameter. The flow parameter may include a flow repeat count, a previous idle timeout for the flow rule, an activity factor, a flow removal count, and a flow inter-arrival statistic.

Determining the idle timeout for the flow rule may include setting the idle timeout for the flow rule to a first value in response to determining that the flow has not been received before, and determining a previous idle timeout for the flow rule in response to determining that the flow has been received before. Determining the idle timeout for the flow rule based on the flow parameter may further include setting the idle timeout to a temporal value based on the flow parameter in response to the previous idle timeout being less than a second value.

Determining the idle timeout for the flow rule may further include determining an activity factor for the flow rule in response to the previous idle timeout being greater than or equal to the second value, setting the idle timeout to the second value in response to the activity factor being less than a threshold, and setting the idle timeout to the first value in response to the activity factor being greater than or equal to the threshold. The activity factor may be determined based on the previous idle timeout and the active time of the flow rule.

The method may further include determining a network memory parameter and evicting the flow rule from network memory in response to the network memory parameter being greater than an eviction threshold. The flow rule may be evicted based on the activity factor.

A network controller may include a processor; and a memory coupled to the processor, the memory including a resource management module. The resource management module may be configured to receive a flow, determine a flow parameter for the flow, and determine, via the network controller, an idle timeout for a flow rule, corresponding to the flow, based on the flow parameter.

The flow parameter may include a flow repeat count, a previous idle timeout for the flow, and an activity factor. Determining the idle timeout for the flow rule based on the flow parameter may include determining whether the flow has been received before, setting the idle timeout for the flow rule to a first value in response to determining that the flow has not been received before, and determining a previous idle timeout for the flow rule in response to determining that the flow has been received before.

Determining idle timeout may further include setting the idle timeout to a temporal value based on the flow parameter in response to the previous idle timeout being less than a second value, determining an activity factor for the flow rule in response to the previous idle timeout being greater than or equal to the second value, setting the idle timeout to the second value in response to the activity factor being less than a threshold, and setting the idle timeout to the first value in response to the activity factor being greater than or equal to the threshold. The memory may be further configured to determine a network memory parameter; and evict the flow rule from network memory in response to the network memory parameter being greater than an eviction threshold. The eviction may be based on an activity factor.

DETAILED DESCRIPTION

Figure 1:
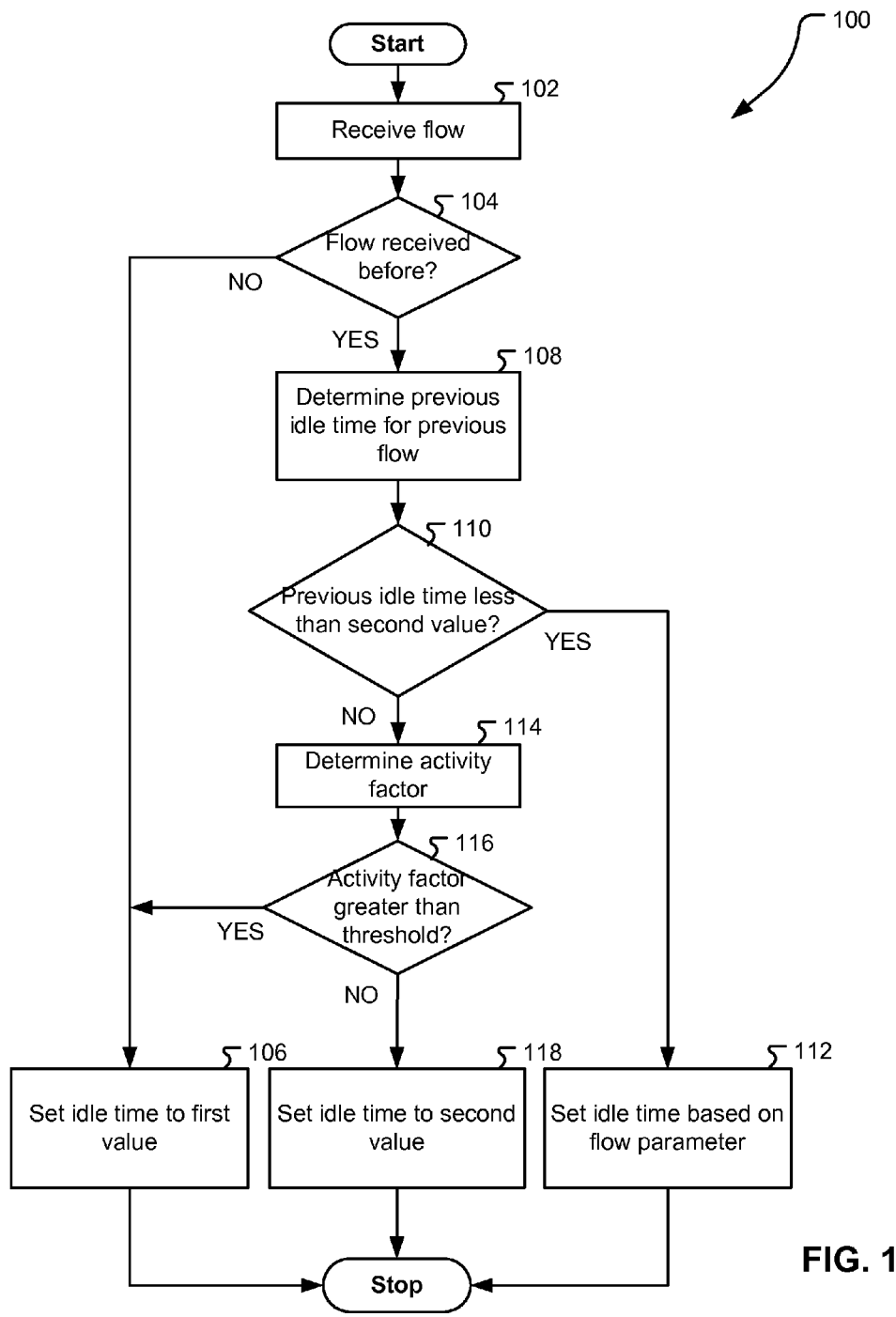
FIG. 1 is a flow diagram of a method of network resource management which may determine an idle timeout for a flow rule, corresponding to a flow, according to an embodiment.

In the following description, reference is made to the accompanying drawings which, by way of illustration, include various examples by which the disclosure may be used. Other examples of the disclosure may be used, as structural and operational changes may be made without departing from the scope of the present disclosure.

While the same nomenclature and same numbers may be used to identify elements throughout the disclosure, this practice is not intended to limit the scope of the disclosure. Identified elements in one figure may not be identical to other same named or identified elements in other figures.

The present disclosure relates to a method, system and apparatus for controller based network resource management. Specifically, the disclosure relates to controller based management of network memory and flows in a software defined network.

Software defined networking (SDN) using protocols such as OpenFlow is gaining popularity and adoption in modern networking and modern data centers. SDN may provide a controller (representing a control plane), which is decoupled from a forwarding network device such as a switch or router (representing a data plane). The control plane and the data plane may make up a communications network over which host devices may communicate and transmit and receive packets of data that together form network flows. Decoupling the control plane and the data plane may increase networking flexibility through programmable route computation. However, decoupling the control plane from the data plane may increase stresses on the data plane, as the SDN may require flow rules to be installed in the data plane which allow the data plane to process the flow corresponding to the flow rule. Specifically, the SDN may require flow rules to be installed in limited network memory located in the data plane.

The network memory may generally include content addressable memory such as ternary content addressable memory (TCAM). The network device may have a TCAM with a size to accommodate approximately between 750 to 2000 flows. However, modern datacenters may receive up to 10,000 network flows per second per server rack which may result in increased network memory demand to accommodate flow rules for this number of flows. Increasing the network memory, specifically increasing the size or quantity of TCAMs, may not be viable as TCAMs may be expensive and may increase power consumption.

To accommodate the limited network memory, the SDN may assign each flow rule with an idle timeout period which may control its eviction from the network memory. If no flow matches a given flow rule for a period equal to its idle timeout period, the flow rule may be removed from the network memory. The idle timeout may be set by the controller before sending a flow rule to the switch for installation. Further, the idle timeout may not be modifiable after being sent to the switch as the SDN specifications, such as OpenFlow specification, may not allow for the modification. Further, modification of flow rules in real time may require polling of the flow rule usage statistics to acquire real time information regarding the flow rules. Polling the network may be difficult depending upon the number of flows and the SDN architecture being used. The controller may generally install flow rules with a user specified constant idle timeout value, a minimum constant timeout value as defined by the SDN specification, or an infinite timeout value (which implies that the flow rule does not expire from the network memory).

A method of memory management, which may be implementable within a SDN, may adapt to inter-arrival times and result in some flow rule evictions even for frequently occurring flows in order to respond to flow changes. Inter-arrival times may be the time between each arrival of the flow into the system and the next arrival of the flow. A memory management system may have to balance between making idle timeouts a non-decreasing function of inter-arrival and proportional to inter-arrival times for responsiveness with implementability in an SDN architecture such as OpenFlow.

Some SDN controller implementations install flow rules for all flows with a constant idle timeout. However, flows may vary widely in their duration with approximately 50% of flows being less than 1 second duration and approximately 80% of the flows being less than 10 seconds. A fixed idle timeout may result in decreased efficiency for network memory for short lived flows when the timeout is too high. If the timeout is too high, the flow rule may sit in network memory for longer than required and may waste space which could be utilized by another flow rule. This may result in increased network memory utilization and may eventually lead to flow drops if the network memory becomes too full.

If the timeout is too low for the flow rule, the flow rule may expire too quickly and subsequent flows may result in a network memory miss and be redirected to the controller. The controller may then install an appropriate flow rule in the data plane which gets applied to the flow. This additional round trip to the controller may be costly in terms of latency, especially for the initial packet of the flow. A single round trip to the controller may result in an additional latency of around 10-20 milliseconds. Furthermore, this additional round trip may also increase the controller workload, which may prove to be a bottleneck in a data center. Finally an eviction policy may be implemented as more and more network memory is utilized. Flows which are assigned a larger idle timeout may increase the delay for the controller to be notified in case flow activity slows down. This may be due to the controller being notified only after the flow rule has expired. Thus, some proactive evictions of current flow rules may need to be made by the controller as new flows become active.

According to various embodiments, a method of network controller flow management may include receiving a flow, determining a flow parameter for the flow, and determining, via the network controller, an idle timeout for a flow rule, corresponding to the flow, based on the flow parameter.

Referring now to FIG. 1, a method 100 of controller based network resource management may be seen according to an embodiment. In operation 102, a flow may be received. The flow or network flow may be a sequence of data or packets sent from a particular source to one or more particular destinations, such as a host device. The destination may include, but is not limited to, another source computer, a multicast group, a broadcast domain, smart phone, desktop computer, laptop, or other device.

In decision block 104, it may be determined whether a received flow has been received before. If the flow has not been received before then the method 100 may progress to operation 106. In operation 106, the idle timeout may be set to a first value. The first value may be selected to be any number. The number may be a temporal value which represents the duration of the idle timeout in seconds. In an embodiment the first value is selected to be a minimum value. The minimum value may be a number selected which identifies the shortest idle timeout that the method 100 assigns for the flow rule. In an embodiment, the first value is selected as the minimum value when the flow either has a low data rate, is known not to repeat, or has no previous data to make an assessment of the flow. By assigning the idle time for an initial flow to the minimum value, the method 100 may decrease the occurrence of one-time flows and short flows sitting in network memory longer than required. Generally, the minimum value may be selected to be less than one second, as approximately 50% of flows may be less than one second. Further, the $80^{th}$ percentile of inter-arrival times for the majority of flows may be less than one second. In an embodiment, the first value may be selected as 100 milliseconds.

If the flow has been received before, then in decision block 104 the method 100 may progress to operation 108. In operation 108, a previous idle time for the flow rule may be determined. As the controller assigns an idle timeout for a flow the controller may store that information and access it later. In contrast to real time information, the controller may have access to previous idle times in an SDN network. This is because the previous idle times set by the controller may not require real time polling of the network. Previous idle time may be accessed by the controller as a part of memory stored within a networking system, memory within the controller itself, accessed remotely, or by other similar means.

In decision block 110 it may be determined whether the previous idle timeout is less than a second value. If the previous idle timeout is less than a second value then the method 100 may progress to operation 112. The second value may be selected as any number and is further described below. In operation 112, the idle timeout may be set to a temporal value based on a flow parameter. The temporal value may represent the duration of the idle timeout in seconds. The flow parameter may be a numerical or other measurable factor regarding the flows. Some flows may have small inter-arrival times, while other flows may rarely repeat. Thus, a fixed idle timeout of one second may be too large for both these types of flows. Further, assigning a fixed idle timeout for all flows may be inefficient. Thus the per-flow idle timeout should be assigned dynamically and adapt to changes in flow patterns. In an embodiment, the idle timeout may be determined by a steeply increasing exponential function based on the flow parameter. In an embodiment, the flow parameter may include whether the flow has been received before, previous idle timeout for the flow, a flow repeat count, flow inter-arrival times, a flow removal count, and an activity factor. In an embodiment the idle timeout may be a multiplication of the first value (FV) and two raised to the power of the flow repeat count (FRC) (FV*2^(FRC)).

If the previous idle timeout is less than the second value then in decision block 110 the method 100 may progress to operation 114. In operation 114, an activity factor may be determined. The activity factor may be a measurement of the frequency which a particular flow rule is active in the network. The activity factor may be used to gauge how frequently a network device may require flow rules to handle the flow is sent to the network device. For example, flows that repeat after considerable time gap and each time occur for only a short duration may have a small activity factor. The activity factor may be based on the flow parameters. In an embodiment the activity factor is based on inter-arrival times. In another embodiment the activity factor is based on a mathematical operation based on the time the flow rule is active and the idle timeout. The activity factor may be the sum of the total active time of the flow rule and the idle timeout, divided by the total active time of the flow rule. If the activity factor is greater than or equal to a threshold then the method 100 may progress to operation 106 and the idle time may be set to a first value. Operation 106 may be the same or substantially similar as described above.

In decision block 116, if the activity factor is less than a threshold then the method may progress to operation 118. In operation 118, the idle time may be set to a second value. The second value may be selected to be any number. The number may be a temporal value which represents the duration of the idle timeout in seconds. In an embodiment the second value is selected to be a maximum value. The maximum value may be a number selected which identifies the longest idle timeout that the method 100 assigns for the flow rule. Generally, as the idle time is increased the idle timeout may need to be limited to a maximum, as sufficiently high idle timeout may increase prediction errors by the controller. This may occur because larger idle timeouts may slow the amount of incoming flow data to the controller as the flows expire. Prediction errors may result in increased wasted network memory space. As 80% of the flows may be reported to be less than ten seconds, in an embodiment, the second value may be selected as a maximum value of ten seconds.

Figure 2:
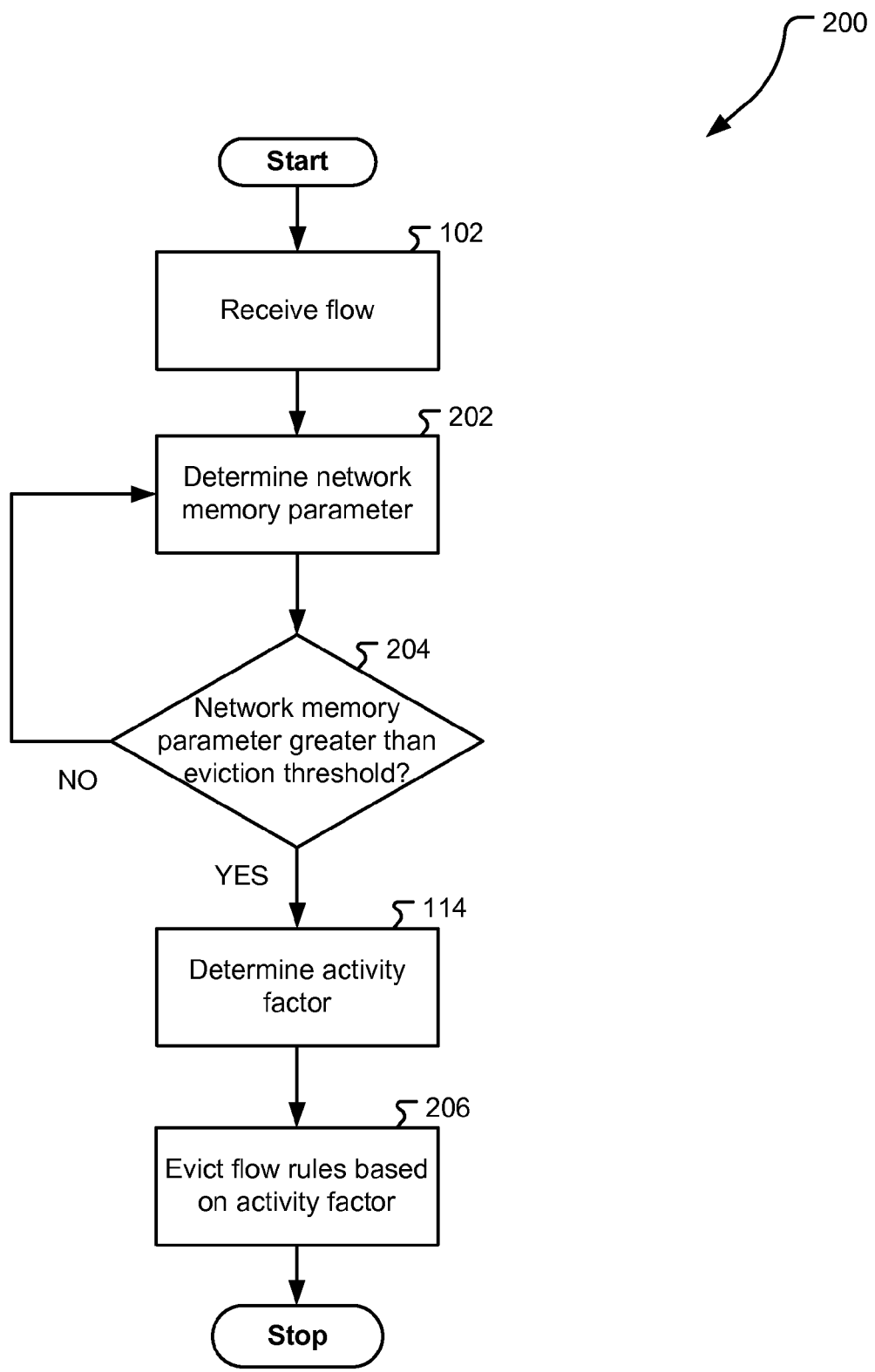
FIG. 2 is a flow diagram of a method of network resource management which may evict a flow rule corresponding to a flow based on a network memory parameter, according to an embodiment.

Referring now to FIG. 2, a method 200 of evicting flow rules from network memory may be seen according to an embodiment. In operation 102, a flow may be received. The flow or network flow may be a sequence of data or packets sent from a particular source to one or more particular destinations, such as a host device. The destination may include, but is not limited to, another source computer, a multicast group, a broadcast domain, smart phone, desktop computer, laptop, or other device. In operation 202, network memory parameter may be determined. The network memory parameter may be a numerical or other measurable factor regarding the network memory. In an embodiment the network memory parameter may include the memory utilization within the system. In an embodiment, the network memory parameter is the ratio of utilized to total network memory in the system.

In decision block 204 it may be determined whether the network memory parameter is greater than an eviction threshold. If the network memory parameter is not greater than an eviction threshold then the method 200 may reset to operation 202. If the network memory parameter is greater than an eviction threshold the method 200 may progress to operation 114. When network memory utilization crosses an eviction threshold the controller may begin evicting flow rules to free space for new flows. The eviction threshold may be selected to be any parameter. In an embodiment, the eviction threshold may be set where the ratio of utilized network memory to total network memory is 95%.

In operation 114 an activity factor may be determined. The activity factor may be a measurement of the frequency which a particular flow rule is active in the network. The activity factor may be used to gauge how frequently a network device may require flow rules to handle the flow is sent to the network device. For example, flows that repeat after considerable time gap and each time occur for only a short duration may have a small activity factor. The activity factor may be based on the flow parameters. In an embodiment the activity factor is based on inter-arrival times. In another embodiment the activity factor is based on a mathematical operation based on the time the flow rule is active and the idle timeout. The activity factor may be the sum of the total active time of the flow rule and the idle timeout, divided by the total active time of the flow rule.

In operation 206, the flow rule may be evicted based on the activity factor. In an embodiment, when the activity factor for a flow rule is greater than three, the flow rule may be evicted. In another embodiment, the flow rule having the greatest activity factor may be evicted. In another embodiment, one or more flow rules may be evicted in order of largest activity factor. However other strategies may be used to evict the flow rules. In an embodiment, the flow rule may be evicted in random order, first in first out order, or based on the average data rate of the flow.

Figure 3:
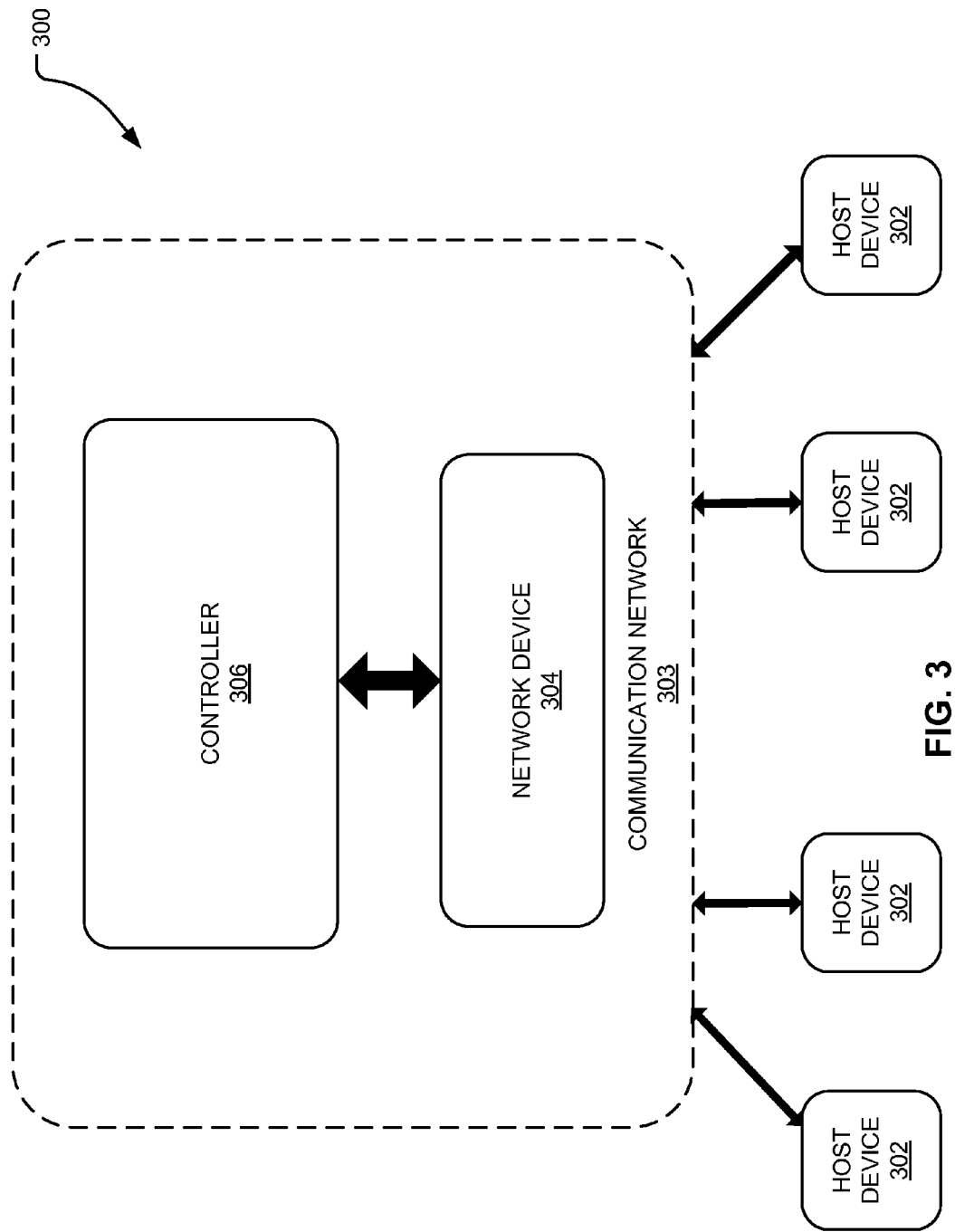
FIG. 3 is a network system for communication of flows in a communication network, according to an embodiment.

Referring now to FIG. 3 a networking system 300 and a controller 306 apparatus may be seen according to an embodiment of the present disclosure. The networking system 300 may include host devices 302 and a communication network 303. The communication network may have a network device 304, and a controller 306. All of these elements may be communicatively coupled, directly or indirectly, for inter-component communication via various connections including wired connections, via buses, wirelessly, or by other type of connection.

The networking system 300 may be implemented for communication of flows between the host devices 302. The host devices 302 may include devices which allow for transmission and reception of data to and from other host devices 302. The host devices may include, but are not limited to, desktop computers, laptops, servers, mainframe computers, mobile phones, tablets, smart phones, or other similar devices. The networking system 300 may be understood as a private or public network implementing a communication network 303 over which the host devices 302 may communicate with each other. In an embodiment, the communication network 303 may be configured to function based on OpenFlow communication protocols for communication of flows.

The communications network 303 may be implemented as a wireless network or wired network, or combination thereof. The communication network 303 may also be an individual network or a collection of many such individual networks, interconnected with each other and functioning as a single large network. The communication network 303 may be implemented as one of various types of networks such as local area network (LAN), wide area network (WAN), and other similar types of networks. The communications network 303 may be a dedicated network or a shared network. The communications network 303 may also use a variety of protocols including, but not limited to, Hypertext Transfer Protocol (HTTP), Transmission Control Protocol/Internet Protocol (TCP/IP), etc., to communicate with each other. The host devices 302 may work on communication protocols that are compatible with the communication network 303 to which the host devices 302 are coupled.

The communication network 303 may have a controller 306 and a network device 304. Although FIG. 3 shows only one controller 306 and one network device 304, multiple controllers and multiple network switches may be used in the communication network 303. The network device 304 may include, but is not limited to, network switches and network routers. The controller 306 may be communicatively coupled to the network device 304 for the purpose of controlling forwarding behavior of the flow to the network device 304. The controller 306 may be implemented by software, hardware, or a combination thereof. The controller 306 may be contained in a desktop computer, laptop, tablet, server, or other similar device. As communication network 303 may be configured to communicate in OpenFlow, the controller 306 and the network device 304 may be OpenFlow devices.

Figure 4:
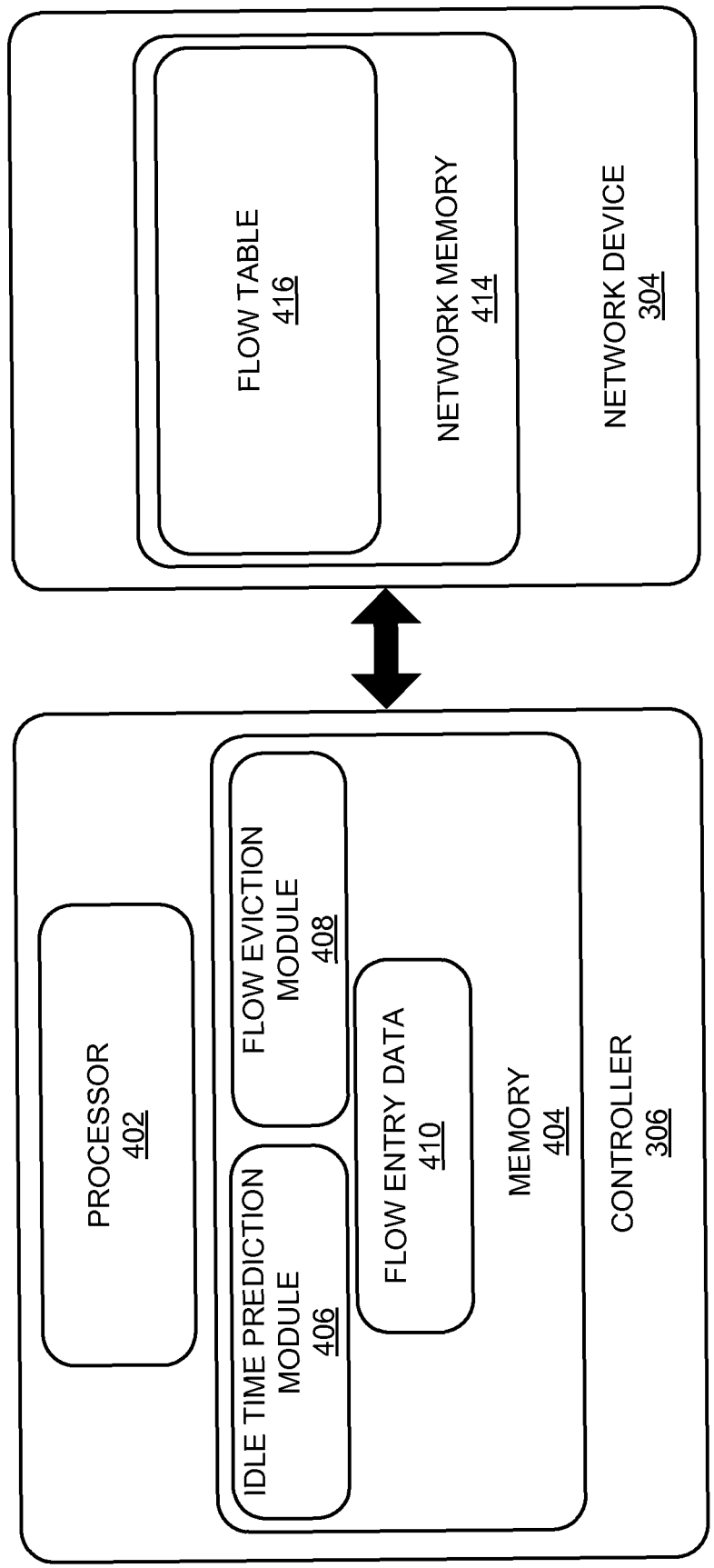
FIG. 4 is an illustration of a controller and a network device according to an embodiment.

Referring now to FIG. 4, a controller 306 and network device 304 may be seen according to an embodiment of the present disclosure. The controller 306 may include a processor 402 and memory 404. The memory may include an idle time prediction module 406, a flow eviction module 408 and flow entry data 410. The network device 304 may include network memory 414. The network memory may include a flow table 416. The controller 306 and the network device 304 may be the same or substantially similar as described above in reference to FIG. 3.

The processor 402 may include one or more general-purpose programmable central processing units (CPUs). In an embodiment, the controller 306 may contain multiple processors 402; however, in another embodiment the controller 306 may alternatively be a single CPU system. The processor 402 may execute instructions stored in the memory 404 and may include one or more levels of on-board cache. The processor 402 may include various types of processors such as, digital signal processor (DSP) hardware, network processor, application specific integrated circuit (ASIC), field programmable gate array (FPGA), or other types of processors. The memory 404 may be coupled to the processor 402.

The memory 404 may include a random-access semiconductor memory, storage device, or storage medium (either volatile or non-volatile) for storing or encoding data and programs. The memory 404 may be conceptually a single monolithic entity, but in other embodiments the storage 404 may be a more complex arrangement, such as a hierarchy of caches and other memory devices. The memory 404 may store data, instructions, modules, and other types of information, hereafter collectively referred to as "memory elements." Although the memory elements are illustrated as being contained within the memory 404 in the controller 306, in other embodiments some or all of them may be on different computer systems and may be accessed remotely, e.g., via a network.

The controller 306 may use virtual addressing mechanisms that allow the programs of the controller 306 to behave as if they only have access to a large, single storage entity instead of access to multiple, smaller storage entities. Thus, while the memory elements are illustrated as being contained within the memory 404, these elements are not necessarily completely contained in the same storage device at the same time. Further, although the memory elements are illustrated as being separate entities, in other embodiments some of them, portions of some of them, or all of them may be packaged together.

In an embodiment, the modules may include the idle time prediction module 406 and the flow eviction module 408. The modules may be instructions or statements that execute in the processor 402 or instructions or statements that may be interpreted by instructions or statements that execute in the processor 402, to carry out the functions as described above with reference to FIGS. 1 and 2. The idle time prediction module 406 may contain instructions to receive a flow, determine a flow parameter for the flow, and determine an idle timeout, via the controller 306, for a flow rule, corresponding to the flow, based on a flow parameter. The instructions of the idle time prediction module 406 may be the same or substantially similar to the method described above with reference to FIG. 1.

The flow eviction module 408 may contain instructions to determine a network memory utilization parameter, and evict a flow from network memory in response to the network memory utilization parameter being greater than an eviction threshold. The instructions of the flow eviction module 408 may be the same or substantially similar to the method described above with reference to FIG. 2. The flow entry data 410 may serve as a repository for storing data that may be fetched, processed, received, or generated by one or more of the modules. In an embodiment, the flow parameters may be stored as flow entry data 410. The flow parameters may be the same or substantially similar as described above with reference to FIG. 1. In an embodiment the flow parameters may include whether the flow has been received before, previous idle timeout for the flow, a flow repeat parameter, a flow inter-arrival parameter, a flow removal parameter, and an activity factor. The idle time may be based on the flow parameter in a mathematical operation.

The network memory 414 may include content addressable memory, including ternary content addressable memory (TCAM). The network memory 414 may also include random-access semiconductor memory, storage device, or storage medium (either volatile or non-volatile) for storing or encoding data and programs. However, the network memory 414 may include the flow table 418 which may allow the network device 304 to receive one or more flow rules and to store one or more flow rules in the flow table 418. The flow rules may allow the network device to accept matching flows and to direct the flows to a particular host device.

As will be appreciated by one skilled in the art, aspects of the present invention may be embodied as a system, method, computer program product or computer program. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of".

The foregoing description of exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined in view of what would be apparent to those skilled in the art from the description provided herein and the claims appended hereto.

We claim:

1. A network controller comprising:

a processor; and a memory coupled to the processor, the memory including a resource management module configured to:

receive a flow;

determine a flow parameter for the flow; and determine, via the network controller, an idle timeout for a flow rule, corresponding to the flow, based on the flow parameter, wherein determining the idle timeout for the flow rule includes:

setting the idle timeout for the flow rule to a first value in response to determining that the flow has not been received before, determining a previous idle timeout for the flow rule in response to determining that the flow has been received before, setting the idle timeout to a temporal value based on the flow parameter in response to the previous idle timeout being less than a second value, determining an activity factor for the flow rule in response to the previous idle timeout being greater than or equal to the second value, setting the idle timeout to the second value in response to the activity factor being less than a threshold, and
setting the idle timeout to the first value in response to the activity factor being greater than or equal to the threshold.

* * * * *